Jan. 4, 1938.  H. NERWIN  2,104,094
PHOTOGRAPHIC CAMERA
Filed July 30, 1936  4 Sheets-Sheet 1

Inventor:
Hubert Nerwin
by B. Singer
Atty.

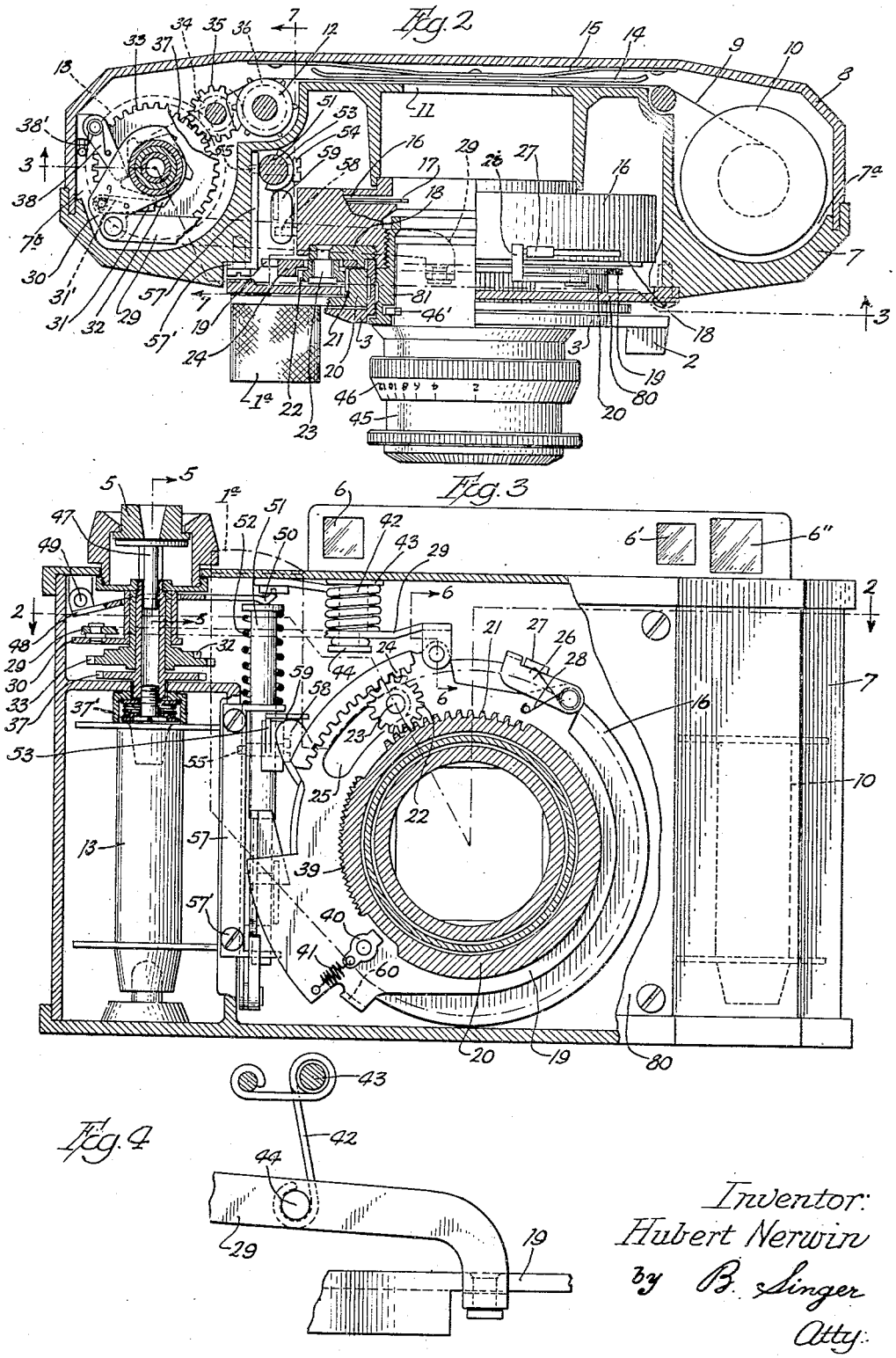

Jan. 4, 1938.          H. NERWIN                    2,104,094
                  PHOTOGRAPHIC CAMERA
                  Filed July 30, 1936              4 Sheets-Sheet 3
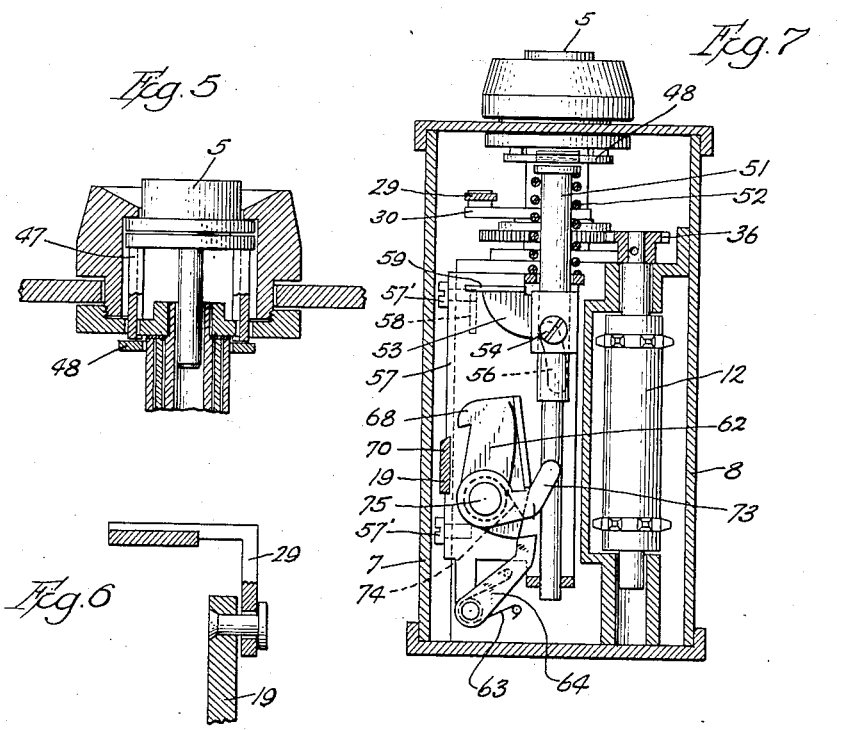
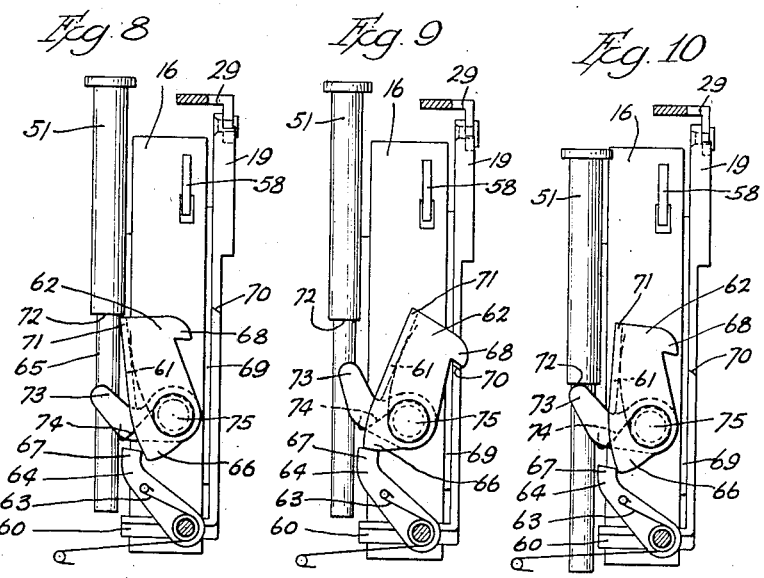
Inventor:
Hubert Nerwin
by B. Singer
Atty.

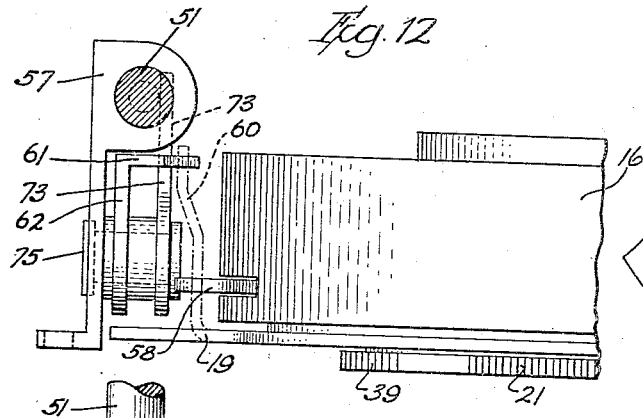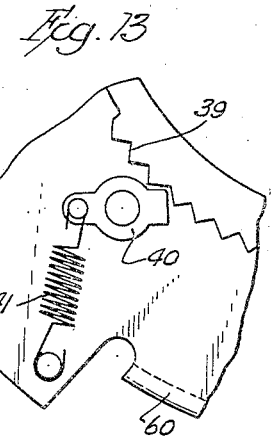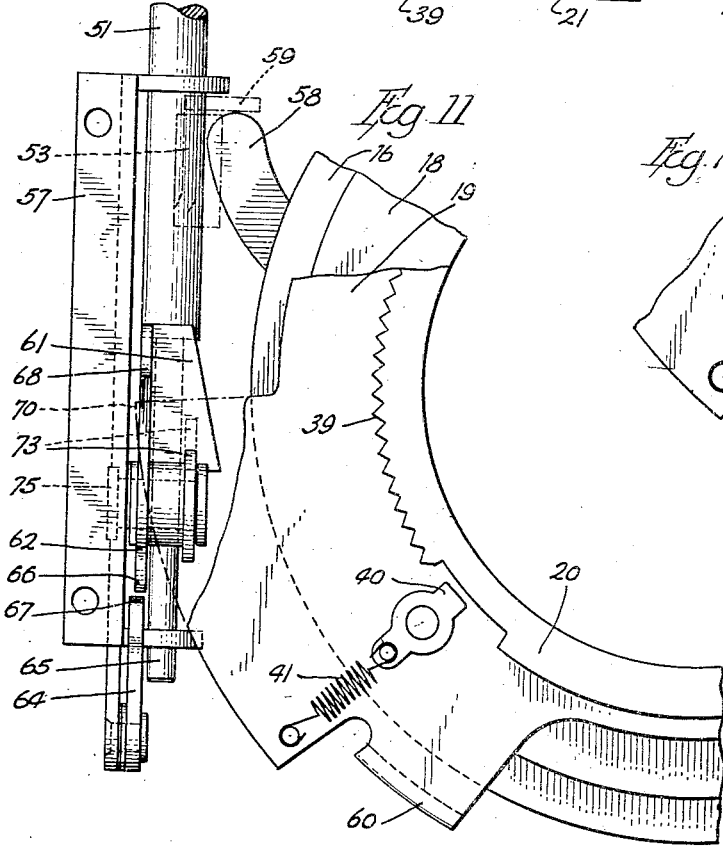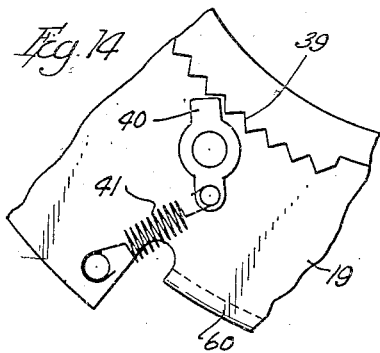

Patented Jan. 4, 1938

2,104,094

UNITED STATES PATENT OFFICE 2,104,094

PHOTOGRAPHIC CAMERA

Hubert Nerwin, Dresden-Blasewitz, Germany, assignor to Zeiss Ikon Aktiengesellschaft, Dresden, Germany Application July 30, 1936, Serial No. 93,367
In Germany June 8, 1935

11 Claims. (Cl. 95—31)

The invention relates to improvements in photographic cameras and particularly pertains to miniature cameras of the roll film type.

It is an object of the invention to improve the readiness of the camera for taking pictures in rapid succession by arranging the operating member for tensioning the shutter and advancing the film strip at such a place that the operator need not remove the camera from its operative position, for instance from in front of his eyes, in order to tension the shutter and advance the film strip for the next picture.

Another object of the invention is to provide for tensioning the shutter and actuating the film advancing means an annular operating member which is coaxially arranged with the lens system and is provided with an outwardly projecting extension adapted to be manually actuated by the operator. This extension preferably terminates in the neighborhood of the customary shutter release button, so that both of these members may be conveniently actuated in quick succession by the same hand, preferably the right hand, while this hand assisted by the left one holds the camera in operative position.

It is also an object of the invention to provide the camera with means which prevents an incomplete tensioning of the shutter and an incomplete advance of the film strip after a picture has been taken. This means insures not only a complete tensioning of the shutter and simultaneously therewith a complete advance of the film strip for one step or picture but also makes it necessary that the annular operating member, which tensions the shutter and actuates the film advancing means, has to be returned completely to its initial position before it again can be moved in the opposite direction.

A still further object of the invention is to provide the camera with means for preventing a double exposure of a film section and to insure that the film section which has been moved into a position behind the lens for exposure is exposed before it can be advanced toward the take-up spool.

Other and further objects and novel features of the invention will be apparent from the following detailed description thereof taken in connection with the accompanying drawings, in which Fig. 1 is a front elevation view of the camera.

Fig. 2 is a horizontal cross-sectional view of the camera, substantially on the broken line II—II of Fig. 3, with certain parts shown diagrammatically and in plan view respectively.

Fig. 3 is a vertical sectional view of the camera, substantially on the broken line III—III of Fig. 2, the film take up spool being shown in elevation.

Fig. 4 shows an enlarged scale in plan view a portion of the spring influenced operating mechanism for advancing the film and tensioning the shutter.

Fig. 5 shows in an enlarged scale a sectional view of the shutter release button substantially on the line V—V of Fig. 3.

Fig. 6 is a sectional view of a lever connection in the film advancing mechanism, substantially on the line VI—VI of Fig. 3.

Fig. 7 is a vertical cross sectional view of the camera, substantially on the line VII—VII of Fig. 2.

Figs. 8, 9 and 10 illustrate diagrammatically the successive operating steps of the safety device which is arranged between the film advancing and shutter tensioning means on one hand and the shutter release means on the other hand.

Fig. 11 shows in an enlarged scale an elevation view of the safety device and its association with the adjacent parts.

Fig. 12 is a plan view of the parts illustrated in Fig. 11.

Figs. 13 and 14 illustrate details of the device in different positions for preventing double exposure and non-exposure respectively.

Figure 1:
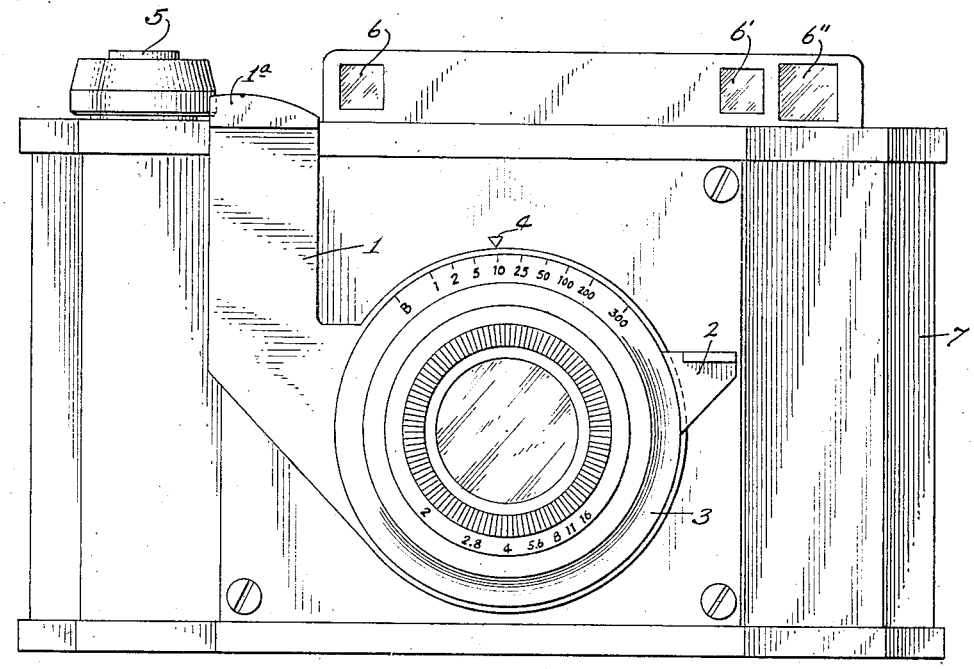

According to the Figs. 1 to 3, the film advancing and shutter tensioning mechanism is arranged coaxially with the lens system and its major operating part consists of an annular member 20 which is provided with an outwardly and upwardly projecting extension 1 terminating adjacent the top wall of the camera in a finger piece 1a which is adapted to be engaged by a finger of the operator. A lever 2 (Fig. 1) is provided for setting the shutter to the desired speed. This lever is integrally connected with a rotatable annular member 3 which has inscribed thereupon the available shutter speed. This annular member 3 is rotated by the lever 2 until the desired shutter speed indication is brought opposite a stationary mark 4. In the immediate neighborhood of the finger piece 1a there is arranged, in the present instance in the top wall of the camera casing, the shutter release button 5. The two light entrance openings of a mirror base distance meter are designated with 6 and 6', while the opening of a view finder is indicated at 6".

Referring now to Fig. 2, it will be noted that the camera casing consists of two separable sections 7 and 8 of which the latter forms a rear cover adapted to permit access to the interior of the front section 7 for the insertion and removal of a roll film. The front section 7 is provided at each end with a semi-cylindrical recess 7a and 7b respectively, for receiving the customary film supply spool 10 and film take-up spool 13 respectively. The film strip 9 is conducted from the supply spool 10 past the picture window 11 and over a film advancing roller 12 to the take-up spool 13. On the inner face of the rear section 8 is secured by means of a spring 15 a backing plate 14 which yieldingly presses the film flat against the picture window 11. The shutter device comprises a casing 16 on which is attached the mechanism for tensioning the shutter and for operating the film advancing roller 12. The shutter segments are diagrammatically indicated at 17. This last named mechanism includes a bearing plate 18 secured to the shutter casing 16, and an annular bearing member 19 which is positioned on the bearing plate 18. All these parts are arranged inside the front section 7 of the camera casing and are covered by the front wall 80 of the casing, through which also extends a mounting sleeve 81 into which an exchangeable lens system 45 is adapted to be secured by means of a customary bayonet lock 46'. The lens system 45 is focussed by rotating the ring 46.

Figure 15:
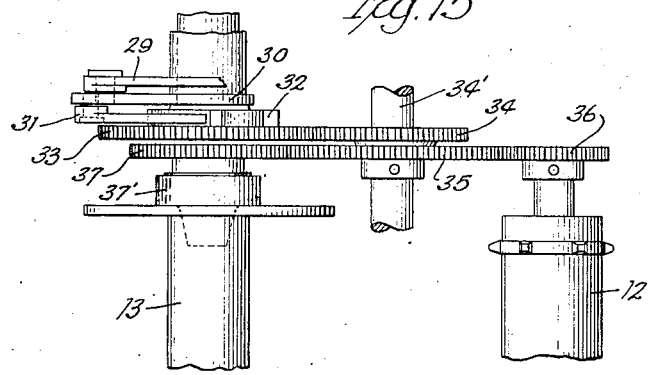
Fig. 15 illustrates a gearing for operating the film advancing roller and the film take-up spool.

The annular operating member 20 concentrically surrounds the mounting sleeve 81 and projects with its outer end, which carries the extension 1, through a suitable opening in the front wall 80. The inner end of the annular operating member 20 is provided with a toothed segment 21 which meshes with a gear 22 rotatably mounted on a stub shaft 23 secured to the bearing plate 18 (Fig. 2). When the finger piece 1a is depressed, the annular operating member 20 is rotated in anti-clockwise direction and thereby the gear 22 likewise is rotated and in turn drives the annular bearing member 19 in opposite direction, because the bearing member 19 is provided with a gear segment 24 which meshes with the gear 22. The bearing member 19 is provided with an arcuate recess 25 through which the stub shaft 23 including the hub of the gear 22 passes to permit this action just described. A lever 26 which is pivotally secured to the bearing member 19 is adapted to actuate the tensioning lever 27 of the lens shutter, when the finger piece 1a is depressed, thereby tensioning the shutter. The lever 26 is under the influence of a spring 28. At the same time, a linkage 29, 30 which is connected with the bearing member 19 is actuated and drives by means of a ratchet device 31, 32 a gear 33 which in the present instance is integrally formed with the ratchet wheel 32 (Fig. 3). The gear 33 in turn engages a gear 34 on a shaft 34' having secured thereto another gear 35 (Fig. 15). This last named gear 35 meshes with a gear 36 which drives the roller 12 and also meshes with a gear 37 which is coupled with a customary coupling member 37' which drives the film take-up spool 13 (Figs. 3 and 15). The pawl 31 of the ratchet device 31, 32 is normally urged by a spring 31', into engagement with the ratchet wheel 32.

In order to prevent a return movement of the film advancing mechanism when the annular operating member 20 returns to its initial position, a locking pawl 38 is provided which is urged by a spring 38' into engagement with the ratchet wheel 32'. To insure a complete tensioning of the shutter and a corresponding complete advancement of the film, there is provided a control gearing consisting of a toothed segment 39, a locking pawl 40 and a spring 41. The toothed segment 39 is arranged on the annular operating member 20 and the locking pawl 40 is always urged by the spring 41 in such direction that the longitudinal axis of the pawl intersects the center axis of the member 20. Owing to the particular formation of the locking teeth on the toothed segment and the arrangement of the pawl 40, it is impossible to reverse the rotation of the annular operating member 20 until the pawl 40 has been brought out of engagement with the locking teeth 39, which can take place only after the actuation movement or a return movement has been completed. The Figs. 13 and 14 illustrate this operation of the control gearing.

A spring 42 returns the annular operating member 20 and therewith the finger piece 1a to its initial position. This spring 42 is mounted on a bolt 43, and one end of the same engages the pin 44 on the link 29. It is apparent, that the spring 42 is tensioned when the finger piece 1a is depressed and that upon release of the finger piece 1a the spring 42 causes a return movement of the bearing member 19 which by means of the gear 22 is coupled with the annular operating member 20.

The shutter mechanism is released by pushing the button 5, the movement of which is transmitted by the member 47 to the lever 48 which is pivotally mounted at 48. The curved end 50 of the lever 48 engages the upper end of the push rod 51 and pushes the same downward against the action of a spring 52 which surrounds the upper portion of the push rod 51. An arm 53 is secured by a screw 54 to the push rod 51. The end of the screw 54 is cylindrical and projects outwardly from the push rod 51 and into a curved slot 56 (Fig. 7) of a bracket 57 which is secured by screws 57' (Figs. 2, 3, 7) to the camera casing, namely to section 7. When the push rod 51 moves downwardly, the bent end 59 of the arm 53 actuates the release lever 58 of the shutter and moves in a path corresponding to the path in which the release lever 58 is moved (Fig. 3).

The safety device for preventing a double exposure of film sections and also the removal of an unexposed film section from its position behind the lens, is particularly illustrated in the Figs. 7 to 12. Fig. 8 shows the safety device in a position in which the shutter has just been released and is now ready to be tensioned again, whereby according to the foregoing description the exposed film section is advanced toward the take-up spool.

Fig. 9 shows the safety device in a position in which the shutter has been tensioned and simultaneously therewith the next unexposed film section has been moved into operative position, so that the shutter is ready to be released.

Fig. 10 shows the safety device in a position in which the release button of the shutter is pressed downwardly and held in this position so that it is possible to unwind the leading end of the film strip, or to take up the rear end of the film strip respectively.

It will be noted from Fig. 8, that a release of the shutter cannot take place, because the nose 71 of the lever 62, which is rotatable about the shaft 75, is positioned directly under the shoulder 72 of the push rod 51. The shaft 75 is fixedly secured to the bracket 57 (Figs. 7, 11, 12). A pawl 64, which is urged by a spring 63 against a cam 66 of the lever 62 causes the latter to lie against the reduced portion 65 of the push rod 51.

If now, for the purpose of tensioning the shutter and advancing the film strip, the finger piece 1a is pushed downwardly, then the resulting rotation of the annular operating member 20 causes a rotation of the gear 22 which rotates the bearing member 19 in clockwise direction (Fig. 3). This bearing member 19 is now provided with a laterally bent stop 60 which at the end of the aforesaid rotative movement engages a laterally bent portion 61 of the lever 62, and swings the latter about its pivot until its cam 66 jumps over the nose 67 of pawl 64. From then on the lever 62 continues its movement alone under the action of the bearing member 19. Upon the return movement of the bearing member 19 the nose 68 of the lever 62 jumps over the shoulder 70 and now the parts are in the position as shown in the Fig. 9.

In this position (Fig. 9) a tensioning of the shutter and an advance of the film strip is not possible, because a rotation of the bearing member 19 which would cause this action is prevented by the lever 62 whose nose 68 engages the shoulder 70 of the member 19a. The shutter can now be released, in fact it has to be released before it can be tensioned again. Upon depressing the button 5, the lever 48 pushes the rod 51 downwardly, and it will be noted that the nose 71 of lever 62 which in Fig. 8 prevents such a downward movement is out of the way. The shoulder 72 of the push rod 51 engages the rounded end of the lever 73 and swings the same downwardly. This lever 73 is yieldingly connected by a spring 74 with the lever 62 and the latter owing to this connection, is moved by the lever 73 anti-clockwise until the cam 66 on lever 62 has been moved past the nose 67 of the lever 64. From this point on the lever 62 moves alone until its bent portion 61 engages the push rod 51. When the operator removes his finger from the release button 5, the push rod 51 is returned by the spring 52 and the nose 71 of the lever 62 comes to rest under the shoulder 72 on the push rod 51. The parts of the safety device are then again in the position as shown in Fig. 8 in which an actuation of the push rod 51 is prevented until the shutter has been tensioned again.

Fig. 10 illustrates the position of the push rod 51, which is obtained by pressing the button 5 downwardly and holding it downwardly. In this position it is possible to wind the leading end of the film strip upon the take-up spool 13, or to unwind the rear end of the film strip from the supply spool 10 by operating the finger piece 1a. When the finger piece 1a is depressed all the way downwardly, as has been described in connection with Fig. 8, then the stop 60 engages the bent portion 61 of the lever 62 and then causes a movement of this lever.

In order to prevent during this operation that the button 5 is moved again upwardly by the push rod 51, the above mentioned yielding connection of lever 62 with the lever 73 by a spring 74 has been provided. When the finger piece 1a is again pressed downwardly to cause a rotation of the bearing member 19, then the lever 62 is again actuated by the stop 60, as already described, and owing to the action of the spring 74 returns to the position illustrated in Fig. 10 when the bearing member 19 returns to its initial position. When the winding of the leading end of the film strip or the unwinding of the rear end of the same has been completed, the button 5 is released, and hereby the safety device between the shutter release mechanism and the shutter tensioning and film advancing mechanism is again fully operative to prevent a double exposure or a faulty advancement of a film strip section, as already described.

What I claim as my invention is:

1. In a rollfilm camera, a camera casing provided with an aperture adapted to receive a lens system, a shutter with means for tensioning the same, means for conveying the film past said aperture, means for releasing said shutter, and means arranged coaxially with respect to said aperture and rotatable about the center point of the same for simultaneously operating said shutter tensioning means and said film conveying means, said operating means being provided with a manually operable projection terminating adjacent said shutter release means.

2. In a rollfilm camera, a camera casing provided with an aperture adapted to receive a lens system, a shutter with means for tensioning the same, means for conveying the film past said aperture, and means arranged coaxially with respect to said aperture for simultaneously operating said shutter tensioning means and said film conveying means, said operating means including an annular member adapted to be manually rotated in one direction to operate said shutter tensioning means and said film conveying means, and spring means for returning said annular member to initial position after each manual operation.

3. In a rollfilm camera, a camera casing provided with an aperture adapted to receive a lens system, a shutter with means for tensioning the same, means for conveying the film past said aperture, and means arranged coaxially with respect to said aperture for simultaneously operating said shutter tensioning means and said film conveying means, said operating means including an annular member adapted to be manually rotated in one direction to operate said shutter tensioning means and said film conveying means, spring means for returning said annular member to initial position after each manual operation, and means cooperating with said annular member for preventing rotation of the same, in the other direction as long as its rotation in one direction is insufficient to cause a complete tensioning of the shutter and film advancement or a complete return to initial position respectively.

4. In a rollfilm camera, a camera casing provided with an aperture adapted to receive a lens system, a shutter with means for tensioning the same, means for conveying the film past said aperture, and means arranged coaxially with respect to said aperture for simultaneously operating said shutter tensioning means and said film conveying means, said operating means including an annular member adapted to be manually rotated in one direction to operate said shutter tensioning means and said film conveying means, spring means for returning said annular member to initial position after each manual operation, and a spring influenced locking pawl cooperating with said annular member for preventing rotation of the same in the other direction as long as its rotation in one direction is insufficient to cause a complete tensioning of the shutter and a corresponding film advancement or a complete return to initial position respectively.

5. In a rollfilm camera, the combination of shutter release means, a manually operable combined shutter tensioning and film advancing means, and mechanism including a plurality of yieldingly connected and pivotally supported levers associated with both of said means for permitting a second actuation of either of said two means only after the other of said means has been actuated, one of said levers being moved into locking engagement with either one of said two means upon actuation of the respective means while another one of said levers is adapted to be actuated by said shutter release means when the latter is not locked against actuation by said firstly mentioned lever.

6. In a rollfilm camera, the combination of a shutter release means provided with a manually depressible member, a manually operable combined shutter tensioning and film advancing means, and mechanism including a plurality of yieldingly connected and pivotally supported levers associated with both said first mentioned means for permitting a second actuation of either of said two means only after the other of said means has been actuated, one of said levers being moved into locking engagement with either one of said two first mentioned means upon actuation of the respective means while another one of said levers is adapted to be actuated by said shutter release means when the latter is not locked against actuation by said first mentioned lever, said secondly mentioned lever in the depressed position of said manually depressible member preventing said firstly mentioned lever from locking said combined shutter tensioning and film advancing means, so that the latter may be operated to wind-up and unwind the leading end and rear end of the film respectively.

7. In a rollfilm camera, the combination of a shutter release means provided with a manually depressible member, a manually operable combined shutter tensioning and film advancing means, mechanism including a plurality of yieldingly connected and pivotally supported levers associated with both said first mentioned means for permitting a second actuation of either of said two means only after the other of said means has been actuated, one of said levers being moved into locking engagement with either one of said two first mentioned means upon actuation of the respective means while another one of said levers is adapted to be actuated by said shutter release means when the latter is not locked against actuation by said firstly mentioned lever, said secondly mentioned lever in the depressed position of said manually depressible member preventing said firstly mentioned lever from locking said combined shutter tensioning and film advancing means, so that the latter may be operated to wind-up and unwind the leading end and rear end of the film respectively, and means for automatically returning said manually depressible member to initial position after it has been actuated.

8. In a rollfilm camera, a camera casing provided with an aperture adapted to receive a lens system, a shutter with means for tensioning the same, means for releasing the shutter, means for conveying the film past said aperture, a manually operable means coaxially arranged with respect to said aperture for simultaneously operating said shutter tensioning means and said film conveying means, and mechanism associated with said shutter release means and said manually operable means for permitting a second actuation of either of said two last mentioned means only after the other said last mentioned means has been actuated.

9. In a rollfilm camera, a camera casing provided with an aperture adapted to receive a lens system, a shutter with means for tensioning the same, means for releasing the shutter, means for conveying the film past said aperture, a manually operable means coaxiallly arranged with respect to said aperture for simultaneously operating said shutter tensioning means and said film conveying means, and mechanism associated with said shutter release means and said manually operable means for permitting a second actuation of either of said two last mentioned means only after the other said last mentioned means has been actuated, said manually operable means being provided with an outwardly extending operating lever terminating adjacent said shutter release means.

10. In a rollfilm camera, a camera casing provided with an aperture adapted to receive a lens system, a shutter with means for tensioning the same, means for releasing the shutter, means for conveying the film past said aperture, a manually operable means for simultaneously operating said shutter tensioning means and said film conveying means, and mechanism associated with said shutter release means and said manually operable means for permitting a second actuation of either of said two last mentioned means only after the other said means has been actuated, said manually operable means including a rotatably mounted annular member arranged concentrically with respect to said aperture and having gear teeth on a portion of its circumference, a gear rotatably mounted about a fixed axis and meshing with said gear teeth, a second rotatably mounted annular member likewise arranged concentrically with respect to said aperture and having gear teeth meshing with said gear and operatively connected with said film conveying means, said second annular member carrying also a pawl for engaging and actuating said shutter tensioning means, said first named annular member being provided with an outwardly extending operating arm, which when manually actuated in one direction causes simultaneously an operation of said film conveying means and a tensioning of said shutter, and spring means for returning said two annular members to initial position after each manual operation.

11. In a rollfilm camera as set forth in claim 10, including a spring influenced locking pawl pivotally mounted on said second annular member and cooperating with said first mentioned annular member for preventing rotation of the latter in the other direction as long as its rotation in one direction is insufficient to cause a complete tension of the shutter and a corresponding film advancement or a complete return by said spring means to initial position respectively.

HUBERT NERWIN.